United States Patent [19]

Ishii et al.

[11] Patent Number: 5,576,971
[45] Date of Patent: Nov. 19, 1996

[54] APPARATUS FOR DISPLAYING DAMPING EFFECT OR BASE ISOLATION EFFECT

[75] Inventors: Koji Ishii, Kanagawa-ken; Norihiko Adachi, Sagamihara, both of Japan

[73] Assignee: Kajima Corporation, Tokyo, Japan

[21] Appl. No.: 522,529

[22] Filed: Sep. 5, 1995

Related U.S. Application Data

[63] Continuation of Ser. No. 185,418, Jan. 24, 1994, abandoned.

[30] Foreign Application Priority Data

Jan. 26, 1993 [JP] Japan ...................... 5-010731

[51] Int. Cl.$^6$ ............... E04B 1/98; F16H 7/10; G01H 13/00
[52] U.S. Cl. ............ 364/505; 364/506; 364/512; 52/1; 52/167.1; 52/167.2; 73/579; 248/550
[58] Field of Search ............. 364/505, 506, 364/512, 508; 52/1, 167.1; 73/579, 594; 248/550; 188/139

[56] References Cited

U.S. PATENT DOCUMENTS

| | | | |
|---|---|---|---|
| 4,098,034 | 7/1978 | Howell | 52/1 |
| 4,783,937 | 11/1988 | Sato | 52/168 |
| 4,841,685 | 6/1989 | Masri | 52/1 |
| 5,107,634 | 4/1992 | Onoda et al. | 52/1 |
| 5,255,565 | 10/1993 | Judd et al. | 73/579 |

*Primary Examiner*—Emanuel T. Voeltz
*Assistant Examiner*—Kamini S. Shah
*Attorney, Agent, or Firm*—Armstrong, Westerman, Hattori, McLeland & Naughton

[57] ABSTRACT

An apparatus for visually or audibly displaying swinging reducing effect in a structure with a damper or a base isolator, which reduces swinging of building structure during earthquake and increases performance characteristics and structural safety of the structure. The apparatus comprises an earthquake observation device, a computer, a display unit and a communication system for connecting the earthquake observation device, the computer and the display unit. The earthquake observation device records input seismic wave to the structure and response wave of the structure at each given time, and the computer calculates response in case the structure is not provided with damper or base isolator, using dynamic characteristics of the structure and input seismic wave in observation records. Thus, the input seismic wave, observed response wave with damper and base isolator, calculated response wave without damper or base isolator, as well as damping effect and base isolation effect are given on the display unit.

9 Claims, 13 Drawing Sheets

"EARTHQUAKE WAS FELT JUST NOW."

"SEISMIC INTENSITY AT OUR PREMISES WAS OOO."

"SWINGING OF OUR STRUCTURE WAS OOO Gal AT MAXIMUM."

"IF THE DAMPER IS NOT OPERATED, SWINGING IS EXPECTED TO BE OOO Gal AT MAXIMUM. THEREFORE, SWINGING WAS REDUCED TO 1/OOO."

"THE DURATION OF FELT SWINGING WAS OOO SECONDS."

"IF DAMPER IS NOT OPERATED, THE DURATION OF FELT SWINGING WOULD HAVE BEEN OOO SECONDS. THEREFORE, THE DURATION OF FELT SWINGING WAS REDUCED TO 1/OOO."

FIG. 13

APPARATUS FOR DISPLAYING DAMPING EFFECT OR BASE ISOLATION EFFECT

This application is a continuation of application Ser. No. 08/185,418 filed Jan. 24, 1994, now abandoned.

BACKGROUND OF THE INVENTION

1. Field of the Invention

The present invention relates to an apparatus for measuring swinging and shaking and for displaying and informing measured data of the swinging in a structure provided with a damper or a base isolator, which damps or reduces swinging, shaking and shocking of construction and building structures during earthquake and for increasing performance characteristics and structural safety of the structure.

2. Description of the Prior Art

Some of the building structures such as high-rise buildings and towers built in recent years are provided with a damper or a base isolator to minimize swinging, shaking and shock caused by earthquake.

Here, a damper is defined as an apparatus for applying a predetermined stress to a structure such as building to minimize amplitude of swinging caused by earthquake. A base isolator is defined as an apparatus for isolating propagation of swinging by preventing swinging or shaking of the ground due to earthquake from being propagated to structures such as buildings. In the past, however, there has been no apparatus, which directly displays and informs damping effect or base isolation effect in the structures provided with such apparatuses when earthquake occurs. Conventionally, it has been practiced to estimate and calculate the responses of the structure with damper or base isolator, assuming that it is not provided with damper or base isolator, based on the recordings of earthquake observation of the structure when it is provided with damper or base isolator, and the results of the comparison have been reported in documents or video tape recording.

Therefore, for the people working or staying in a building or a high-rise tower provided with damper or base isolator, swinging caused by earthquake is felt only slightly or the duration of felt swinging is very short. As a result, the scale of the earthquake itself is not recognized well, and it is not possible to properly evaluate the benefit of the structure with damper or base isolator.

SUMMARY OF THE INVENTION

It is an object of the present invention to provide an apparatus, which is:

(a) to directly display damping effect or base isolation effect in a structure;

(b) to display damping effect or base isolation effect as soon as possible after earthquake occurs; and (c) to multilaterally display damping effect or base isolation effect in order to give full understanding and recognition of the earthquake to those working or staying in the building.

To attain the above object and to increase added value of the structure, the apparatus according to the present invention comprises:

response wave calculating means for responding to output signal of a ground motion sensor, which measures swinging of the ground directly under or near the structure, for calculating response of said structure to said ground motion when it is assumed that said structure is not provided with a damper or a base isolator, and for obtaining a calculated response; and display means provided at a predetermined position in said structure, and, using a measured response wave, which is an output signal of a response sensor to measure actual response wave of said structure when swinging from said ground motion is applied on said structure and said calculated response wave from said response wave calculating means, comparing and displaying said actual response wave with said calculated response wave.

The power to the essential portions of the apparatus for displaying damping effect or base isolation effect of the present invention is normally turned off, while as soon as earthquake occurs, power to every components of the apparatus is turned on to make them operate, and the data may be displayed on public broadcasting system in the structure or in a monitor center.

DETAILED DESCRIPTION OF THE PREFERRED EMBODIMENTS

Figure 1:
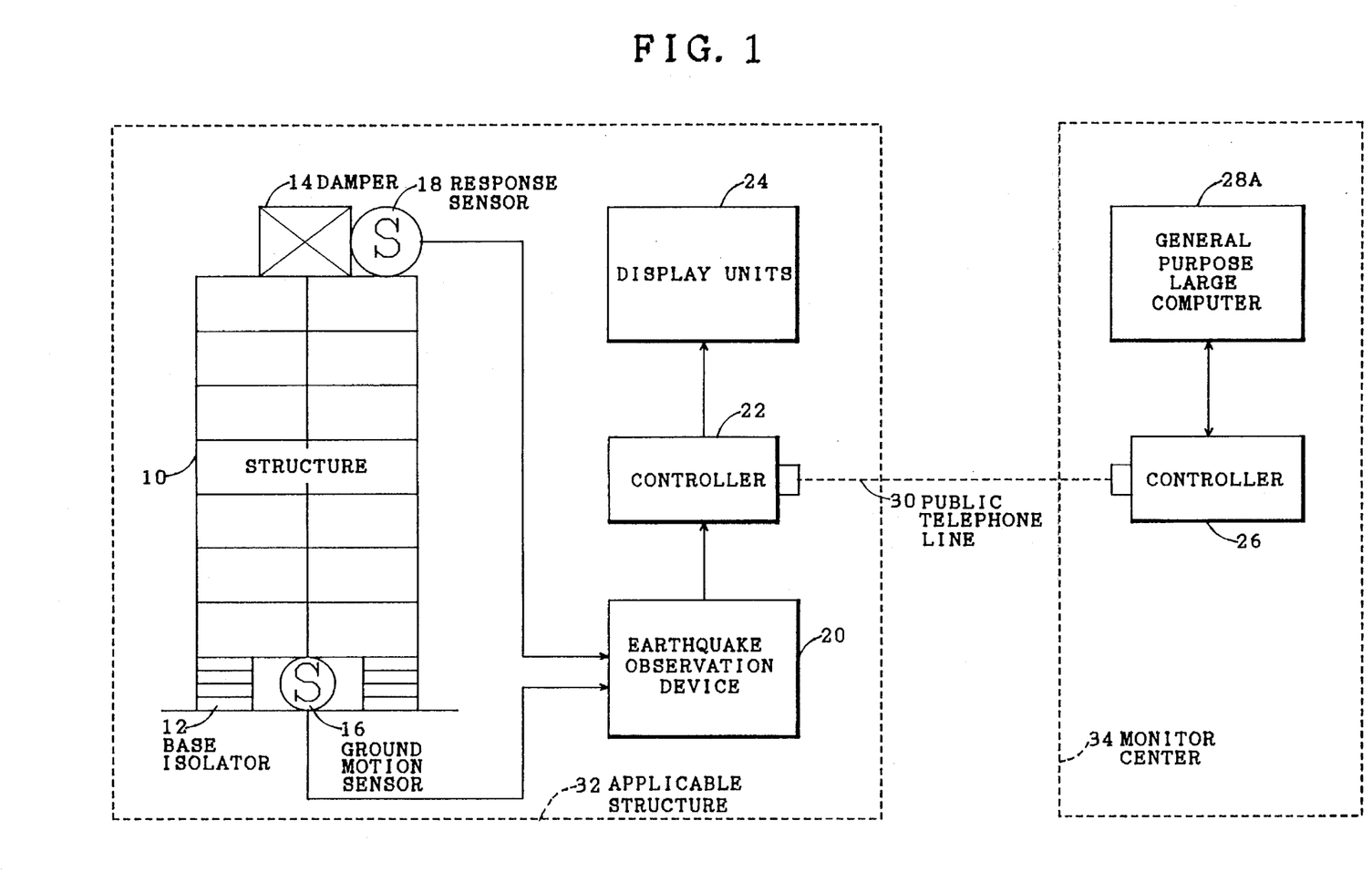
FIG. 1 is a block diagram of an embodiment of the present invention, showing an example using a general purpose large computer.

In the following, description will be given on embodiments of an apparatus for displaying damping effect or base isolation effect of the present invention, referring to FIG. 1 to FIG. 13:

FIG. 1 is a block diagram of an embodiment of the apparatus for displaying damping effect or base isolation effect of the present invention. In FIG. 1, a structure is represented by reference numeral 10 as a building, while this may be other type of structure such as a tower. It is assumed that the structure 10 is provided either with a damper 12 or with a base isolator 14, or with both. In the figure, both devices are shown while only one of them is provided in most cases. A ground motion sensor 16 is to obtain output signal by measuring motion or swinging of the ground immediately under or near the structure 10. As the ground motion sensor 16, a swinging sensor may be used, which has three pickup units for measuring acceleration in three directions of X, Y and Z and provides three types of output signals. A response sensor 18 is provided at a predetermined position on the structure 10. Similarly to the ground motion sensor 16, a swinging sensor may be used as the response sensor, which has 3 pickup units for measuring acceleration in three directions of X, Y and Z respectively and provides three types of output signals.

An earthquake observation device 20 processes and records inputted earthquake wave to the structure 10 and response wave of the structure at each time point represented by output signal from the ground motion sensor 16 and the response sensor 18 and sends the results to a computer by a communication system through public telephone line 30.

The communication system includes controllers 22 and 26. The controllers 22 and 26 comprise interfaces, modems, memories, etc. In FIG. 1, a block 32 shown by dotted line represents a portion of the system installed within or near the structure 10, and another block shown by dotted line indicates a monitor center, which sends and receives data to and from a plurality of structures. As the computer, a general purpose large computer 28A in the monitor center 34 is used.

The computer 28A calculates responses in case where it is assumed that the structure 10 is not provided with a damper or a base isolator, using dynamic characteristics of the structure 10 and inputted seismic wave in the received records, calculates inputted seismic wave, damped or base isolated observed response wave, and non-damped or non-base isolated calculated response wave as well as damping and base isolation effect, and sends these data to display units 24 by a communication system via public telephone line 30. Instead of the public telephone line, a special purpose digital communication line may be used.

As the display units 24, cathode ray tube may be used as visual instrument, or LED display unit may be simultaneously used. As audio equipment, an amplifier, a power amplifier unit with speaker, speech synthesizer, interruption broadcasting equipment to radio and television system may be used.

To obtain dynamic characteristics of the structure 10, calculated values or model values obtained from swinging experiment are used in the initial stage. Later, these are replaced by the values with higher accuracy from the results of analysis of earthquake response observation data obtained each time earthquake occurs.

Damping effect or base isolation effect is expressed by comparing response wave, maximum response value and duration of felt swinging between the case where it is assumed that a damper or a base isolator is not provided in the building 10 and the case where these are provided. The method of comparison are as follows:

(a) Damping effects are compared with respect to seismic wave actually occurred; and (b) Damping effect or base isolation effect is obtained in advance not for seismic wave actually occurred but for standard seismic wave, and it is expressed by a value proportional to maximum input value of seismic wave actually occurred.

Figure 2:
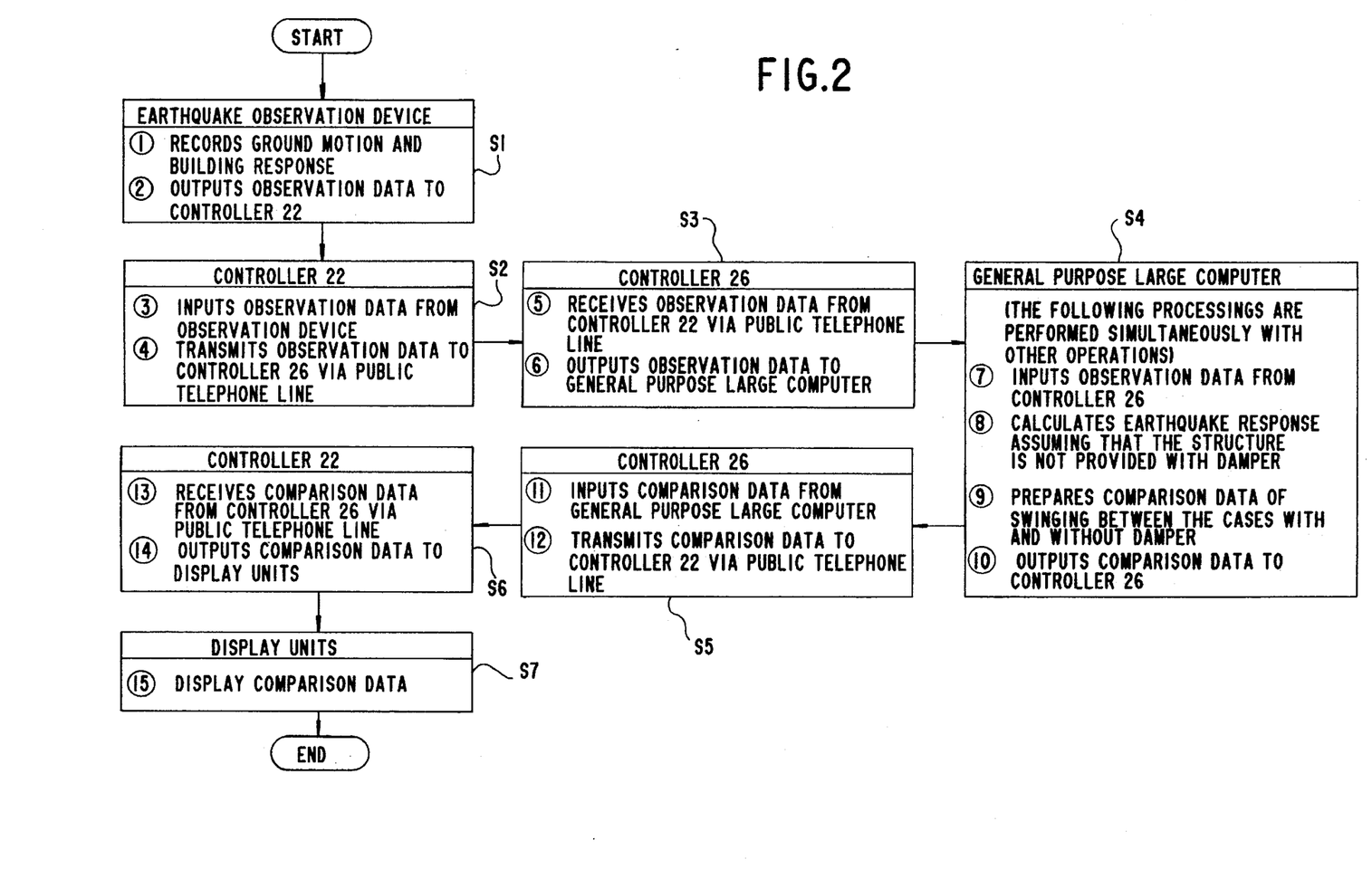
FIG. 2 is a flowchart showing operation of the embodiment of FIG. 1.

FIG. 2 is a flowchart showing operation of the embodiment of FIG. 1. When earthquake data are obtained in Step S1, the data are sent to a monitor center 34 via public telephone line 30 in step S2. The data are processed by a computer 28A in steps S3–S5, and the processed data are received in step S6 and an adequate display is given in step S7.

Figure 3:
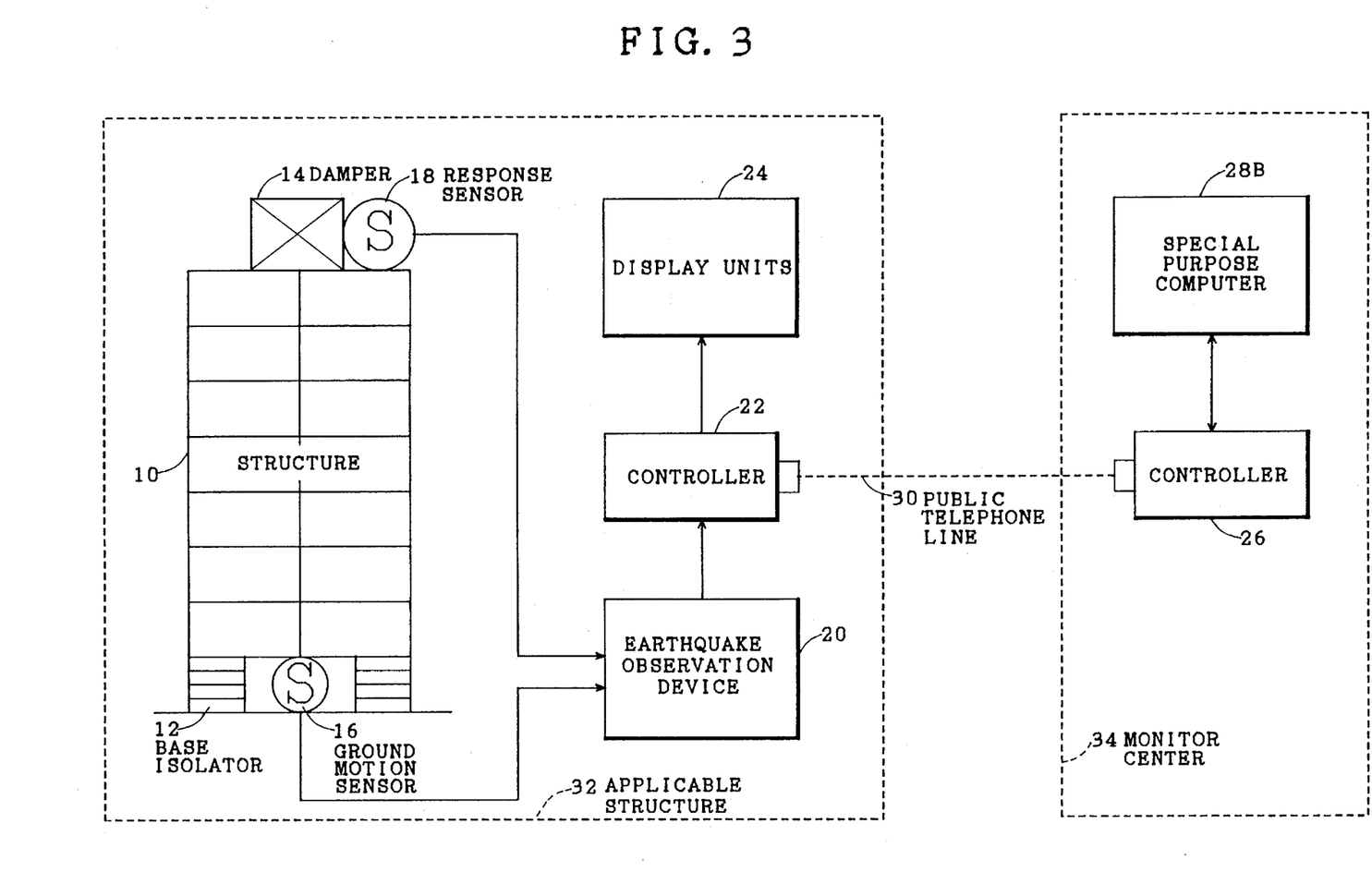
FIG. 3 is a block diagram of another embodiment of the present invention, showing an example which uses a special purpose computer for remote monitoring center.

FIG. 3 is a block diagram showing another embodiment similar to FIG. 1, except that a special purpose computer 28B is used instead of a large general purpose computer 28A in FIG. 1.

Figure 4:
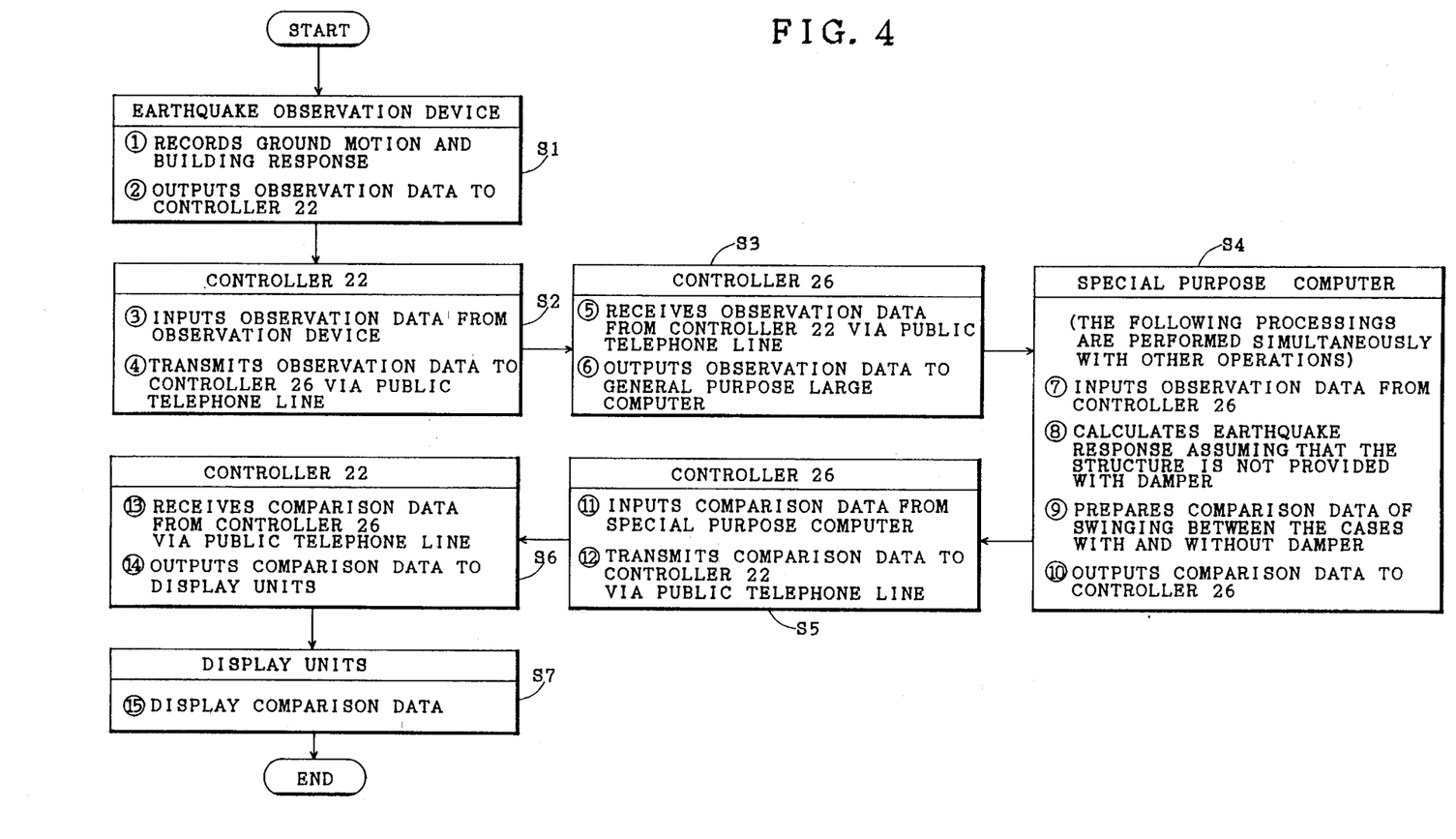
FIG. 4 is a flowchart showing operation of the embodiment of FIG. 3.

FIG. 4 represents a flowchart showing operation of the embodiment of FIG. 3. Detailed description is not given here because it is substantially the same as that of FIG. 2.

In case the computer is installed in the structure, it is possible to compare damped or base isolated data with non-damped or non-base isolated data and to calculate display the results at real time during earthquake.

Figure 5:
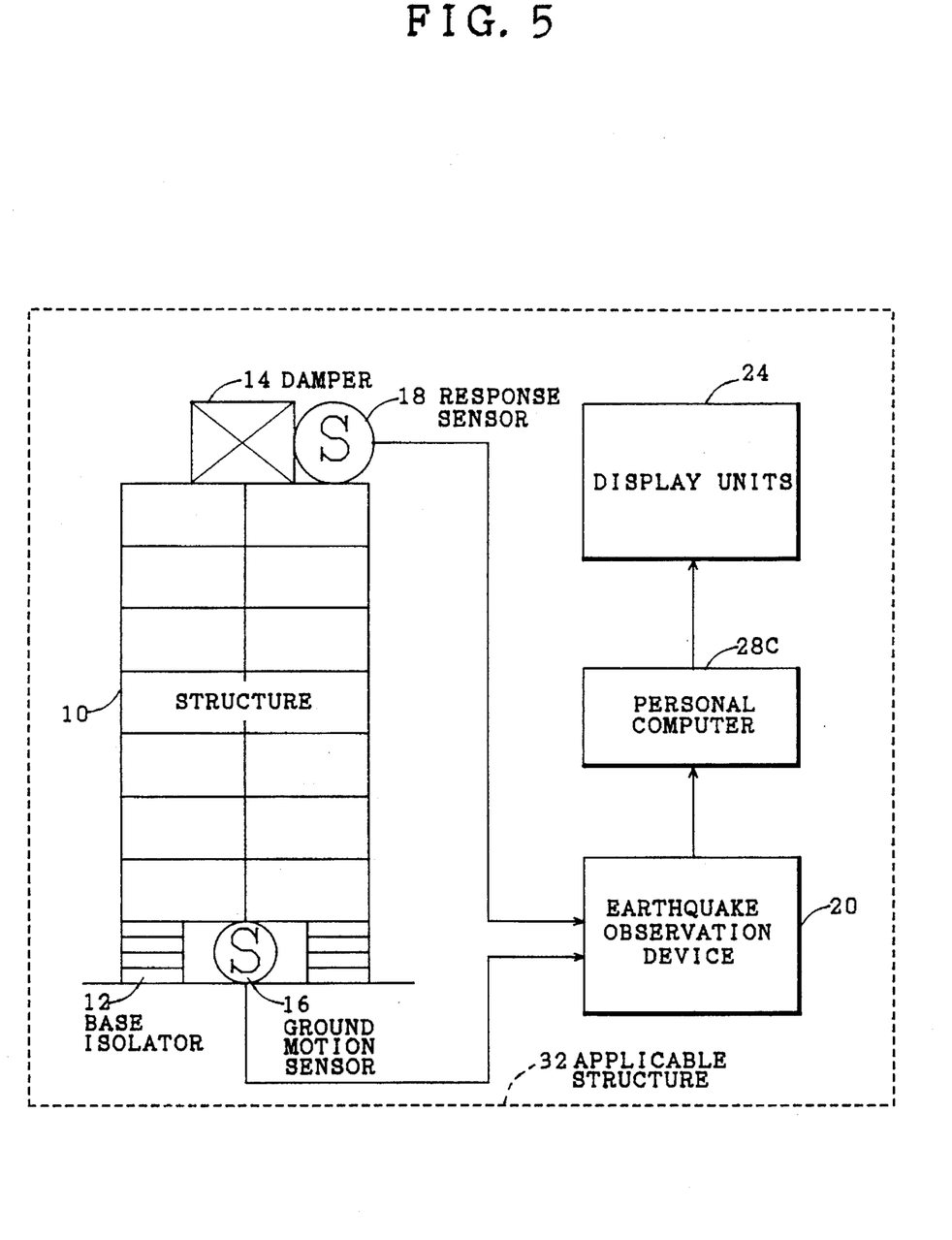
FIG. 5 is a block diagram of still another embodiment of the present invention, showing an example, which uses a special purpose computer installed within a structure.
Figure 6:
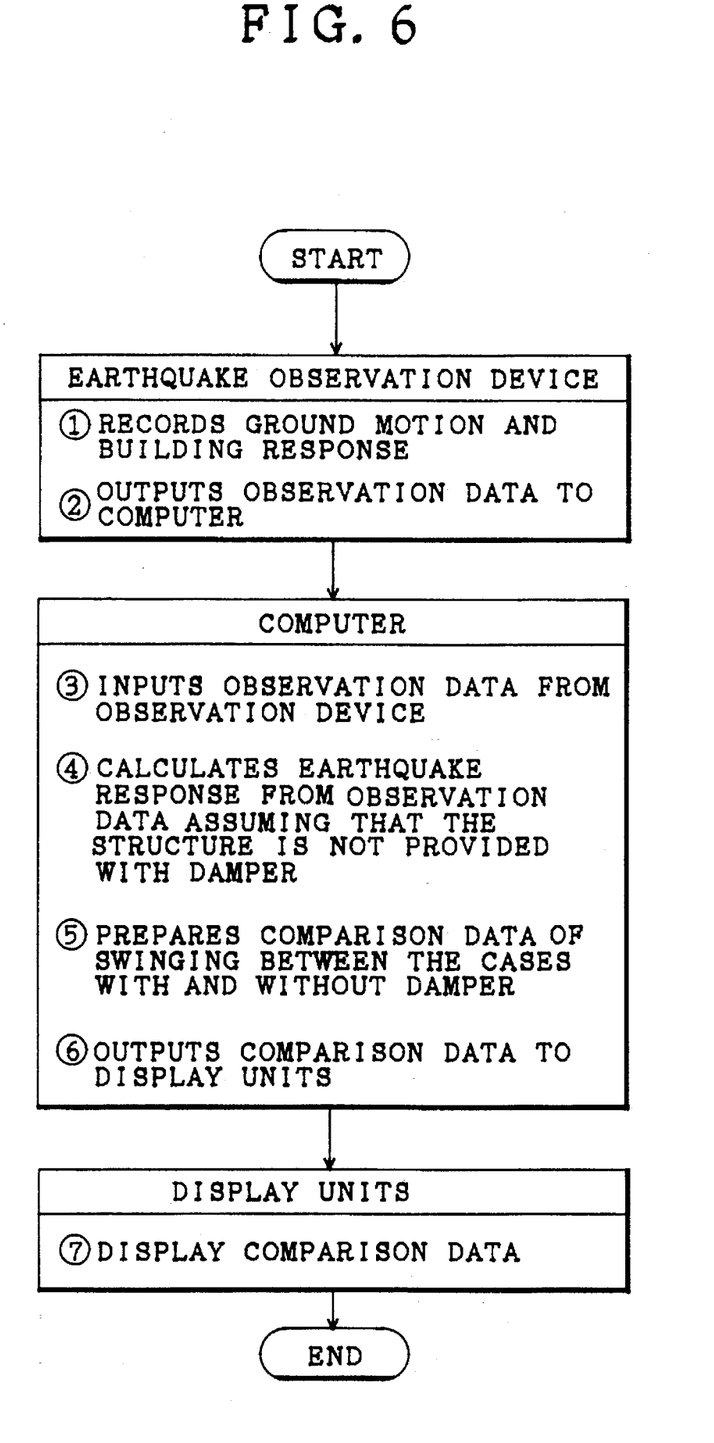
FIG. 6 is a flowchart showing operation of the embodiment of FIG. 5.

FIG. 5 is a block diagram showing an embodiment of such case. It differs from the above embodiments in that a personal computer 28C installed in the structure is used. Therefore, communication system is not required. FIG. 6 represents a flowchart, showing operation of the embodiment of FIG. 5. Except communication operation, it is the same as the embodiments of FIG. 2 and FIG. 4, and detailed description is not given here.

Figure 7:
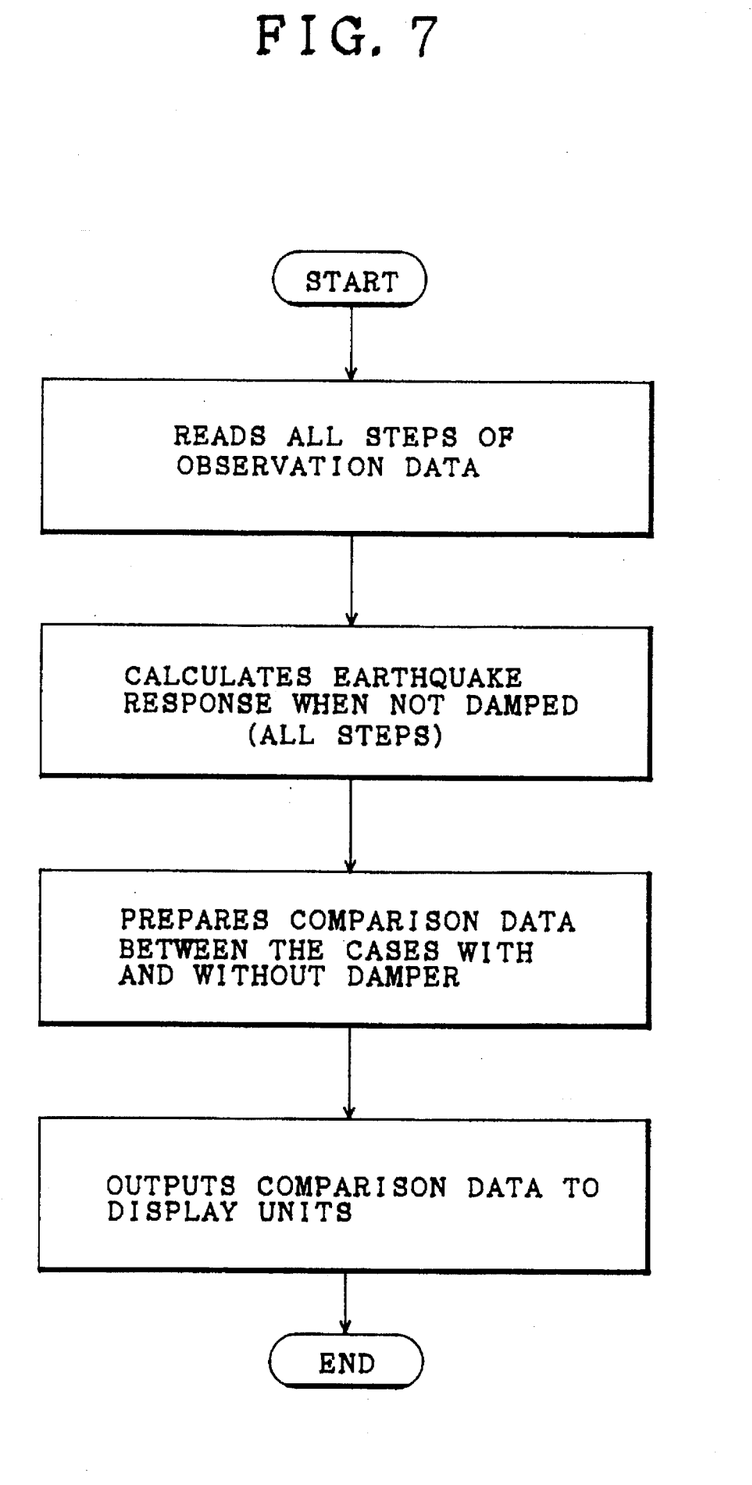
FIG. 7 is a flowchart of post-processing of computers in the above embodiments.
Figure 8:
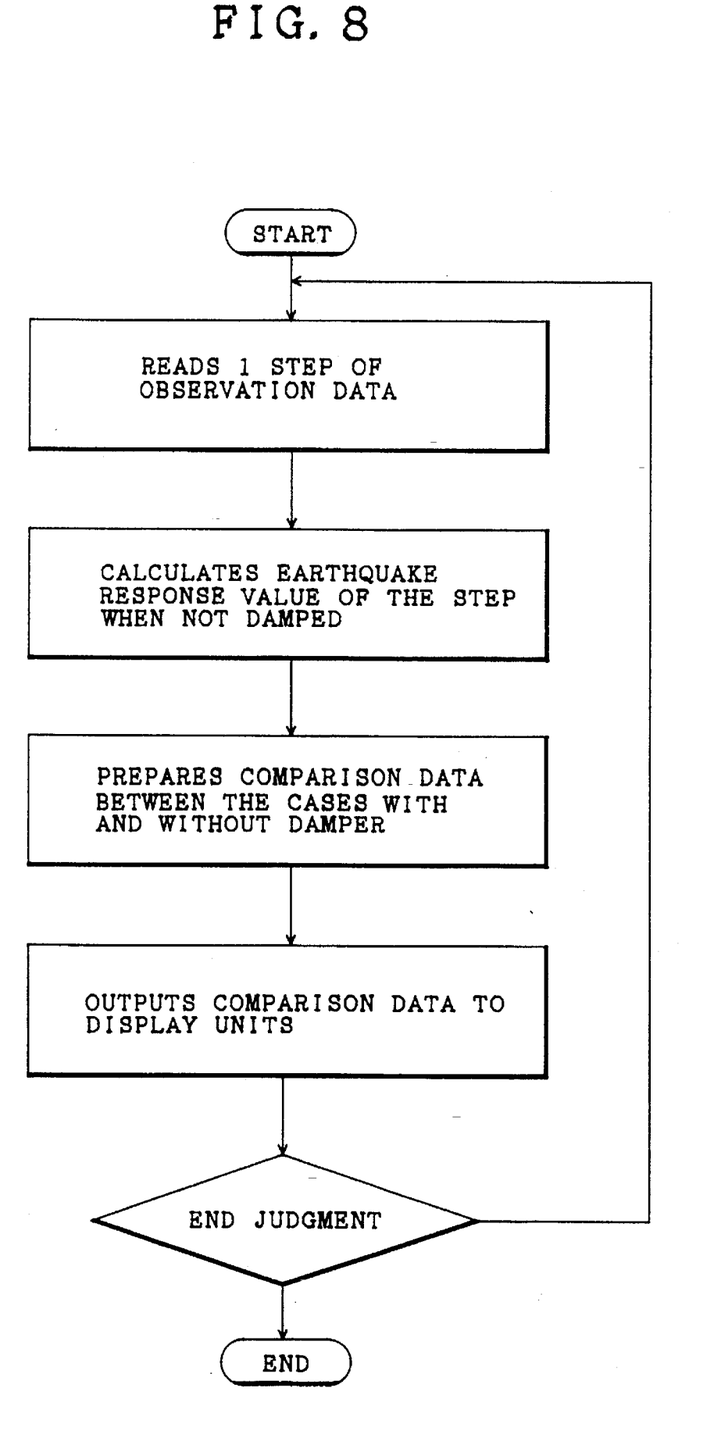
FIG. 8 represents a flowchart of real time processing of computers in the embodiments.

FIG. 7 and FIG. 8 each represents a flowchart showing major steps of the computers 28A, 28B and 28C in the above embodiments. In the example of FIG. 7, a procedure for picking up all observation data at once and for processing them is shown, while the example of FIG. 8 gives the procedure for reading and processing the observation data step by step. In the example of FIG. 8, processings are repeatedly performed in other operation steps until output is terminated for all steps by the end judgement step.

In the above embodiments, when image display unit is used as the display unit 24, the received waveforms are aligned or overlapped to compare, and further, it is possible to compare maximum response values and duration of felt swinging together with other earthquake data (such as the time occurred, hypocenter, magnitude, and seismic intensity). However, because earthquake data must be normally based on the announced data from the Meteorological Agency, the words "under investigation" is displayed immediately after earthquake, and accurate data will be displayed as soon as the information is available. By digital numerical value display unit or by audio broadcasting unit, the results of comparison of maximum response value or comparison of duration of felt swinging are displayed or broadcast by synthesized voice together with the other earthquake data. In case of image display, it is possible to momentarily display the responses of the structure with and without damper or base isolator at real time after earthquake occurs.

Figure 9:
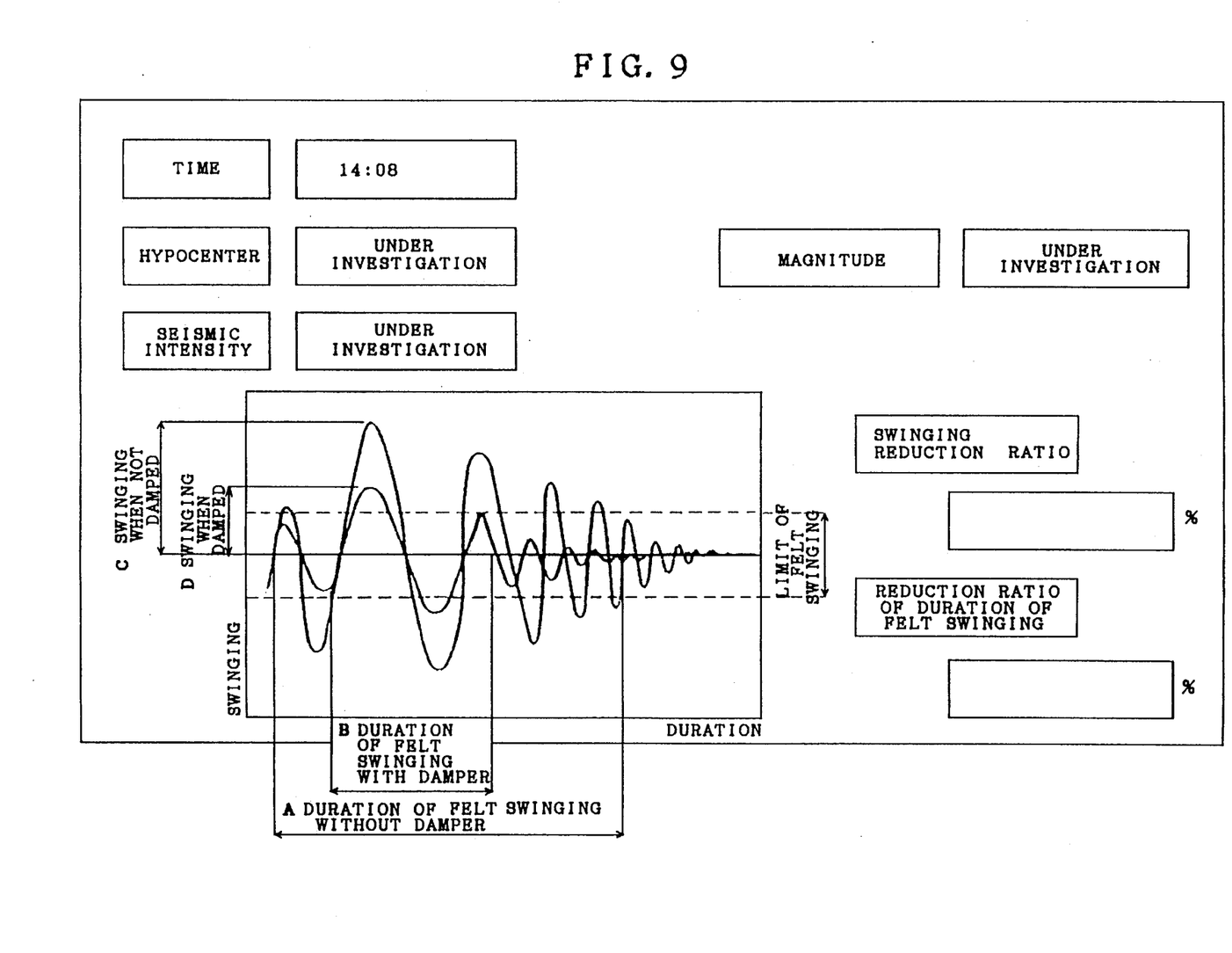
FIG. 9 is a diagram showing an example of image processing display accomplished by the embodiments of the present invention.

FIG. 9 shows an example of display picture of the display unit 24. The waves with larger amplitude in the case where the structure is supposed to be without damper and the waves of smaller amplitude actually measured by the response sensor 18 are overlapped each other for comparison. By changing the colors of these two waveforms, these two types of waveforms can be easily identified. The time until peak values of these waveforms reach the felt amplitude limit value shown by dotted line is defined as the duration of felt swinging.

From the comparison of amplitude peak values, the following data can be obtained:

($D/C$)×100=Swinging reduction ratio (%)

($B/A$)×100=Reduction ratio of duration of felt swinging (%)

where

A: Duration of felt swinging without damper
B: Duration of felt swinging with damper
C: Swinging without damper (peak value)
D: Swinging with damper (peak value)

Such data can be readily calculated by computers 28A, 28B and 28C of the above embodiments.

Figure 10:
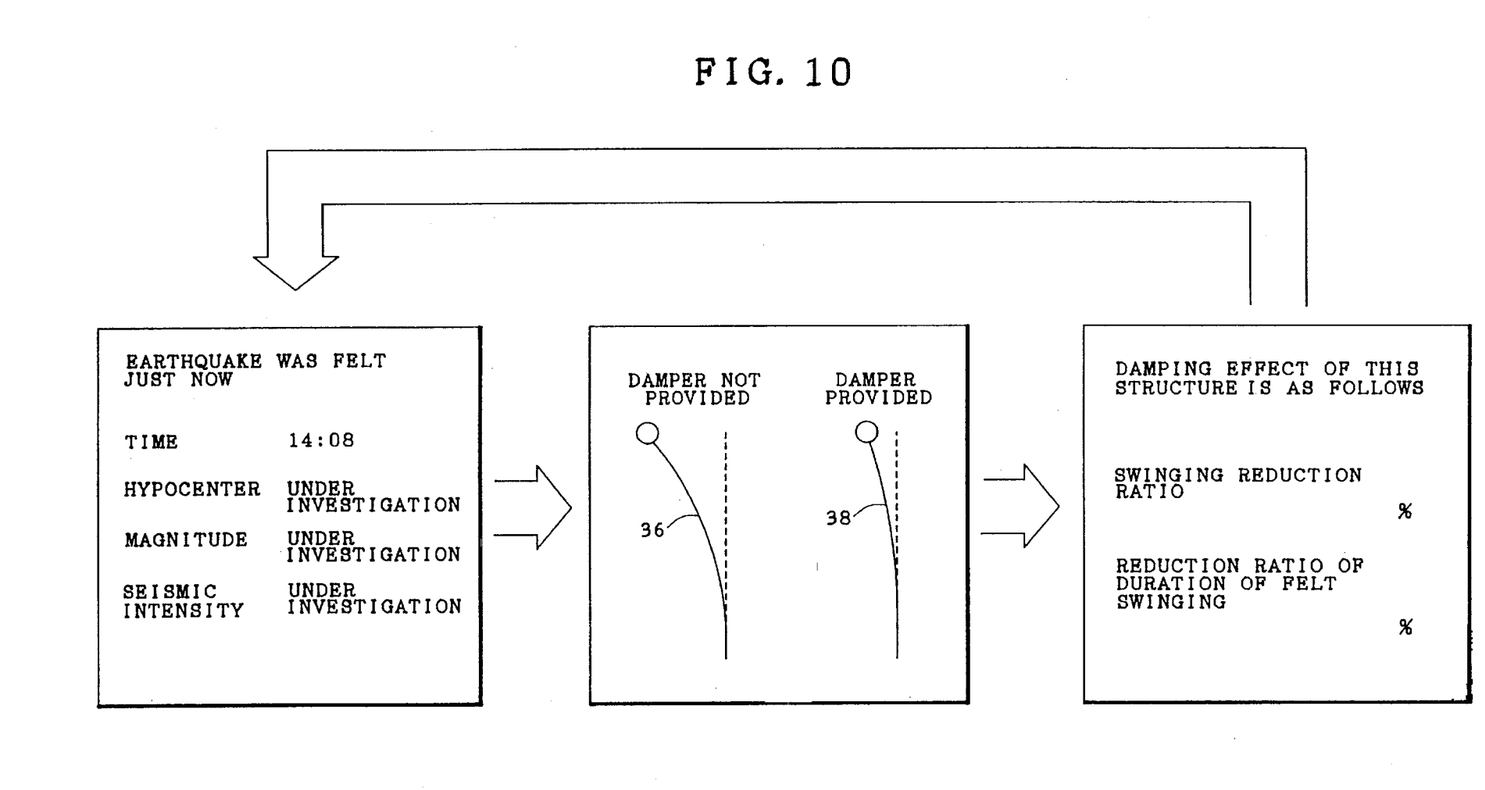
FIG. 10 is a diagram showing another example of image processing display accomplished by the embodiments of the present invention.

FIG. 10 is a schematical graphic representation of a structure with maximum amplitude to show damping effect. Specifically, two bar graphics 36 and 38 to swing at real time are shown on screen of the display unit 24 in advance. By displaying swinging of the bar graphics 36 and 38 as animation, the damping effect can be effectively displayed for the cases with and without damper. Also, it is possible to display the earthquake data together with swinging reduction ratio or reduction ratio of the duration of felt swinging, or to sequentially display these data.

Figure 11:
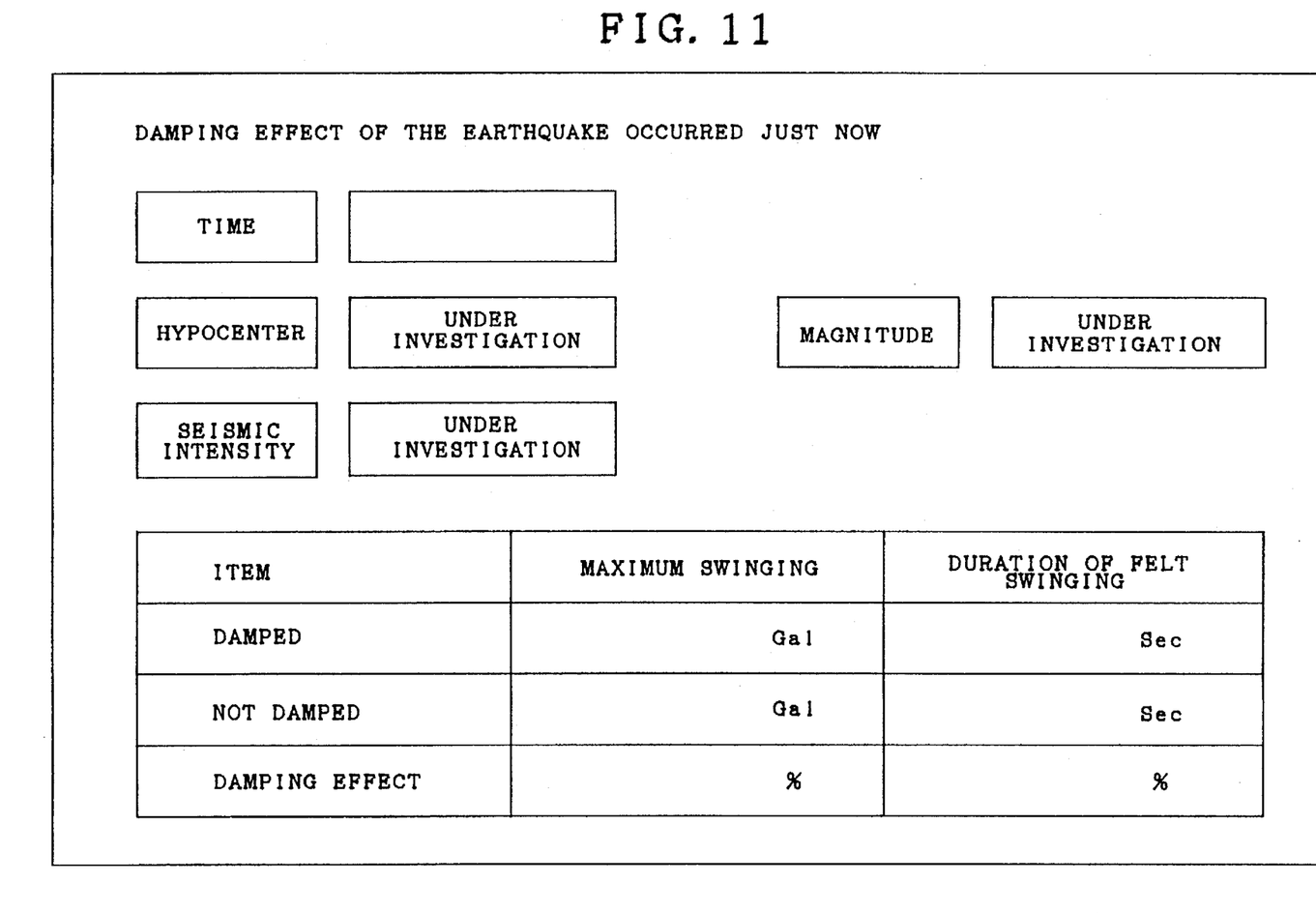
FIG. 11 is a diagram showing an example of digital display accomplished by the embodiments of the present invention.

FIG. 11 shows an example of display picture of the display unit 24 in case damping effects are shown as comparison of numerical values together with earthquake data.

Figure 12:
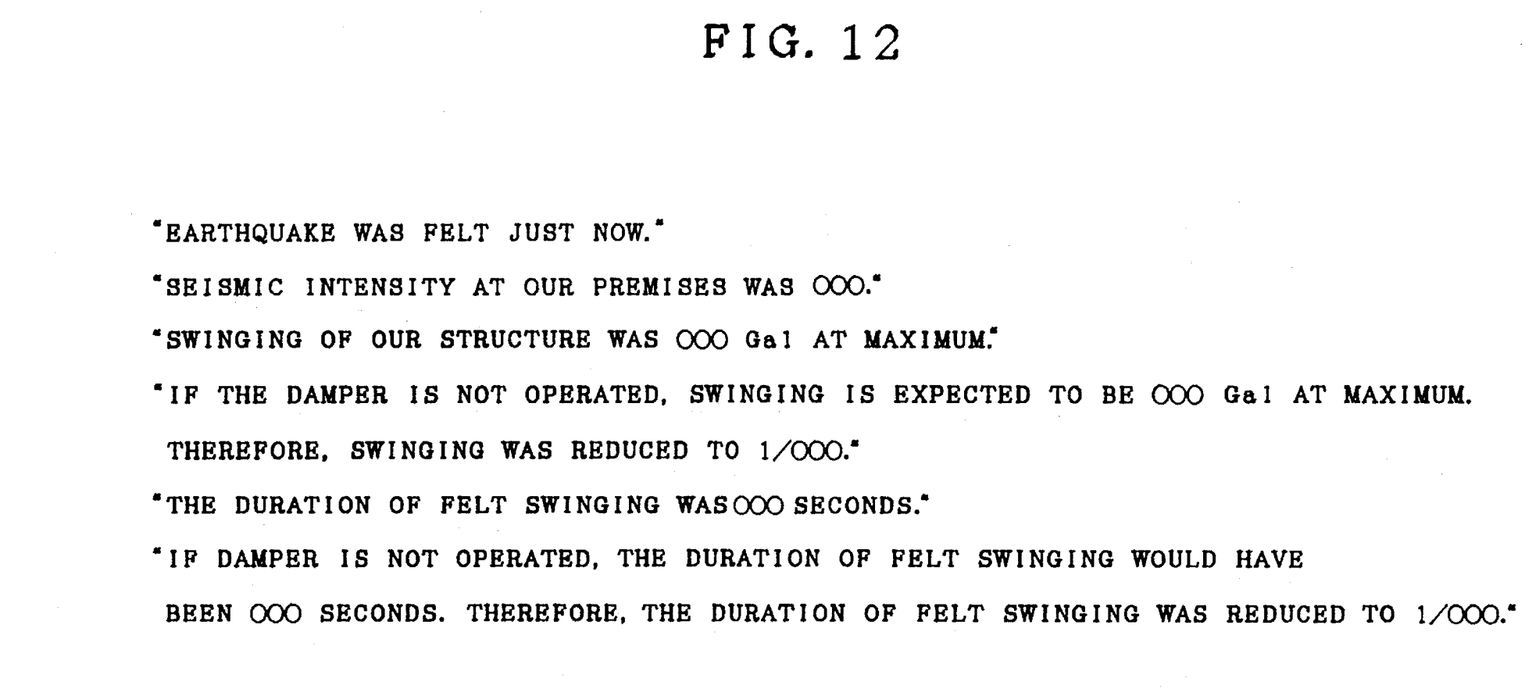
FIG. 12 shows an example of audio broadcasting accomplished by the embodiments of the present invention.

Further, FIG. 12 shows an example of the content of announcement when sound alarm system is used instead of or in addition to the display unit 24. In the portion marked by o o o in the figure, earthquake data or the results of calculation are entered as numerical values in form of synthesized speech.

The power to the apparatus of the present invention is usually turned off for energy-saving purpose, while, as soon as earthquake occurs, power is connected immediately to all components of the apparatus to operate, and apparatus can be designed in such manner that interrupt and display can be achieved on public broadcasting system such as television, radio, etc. in the structure or in the monitor center.

In order that the power is usually not connected to major components of the apparatus and is turned on when earthquake occurs, it can be designed in such manner that power is permanently connected to the earthquake observation device 20, and trigger signal is generated when seismic wave is detected, thereby connecting power to the personal computer 28C and the display unit 24. Further, to interrupt and broadcast on television, radio, etc., similar trigger signal may be used to generate high frequency signal of a predetermined frequency including image and sound as interrupt signal.

Figure 13:
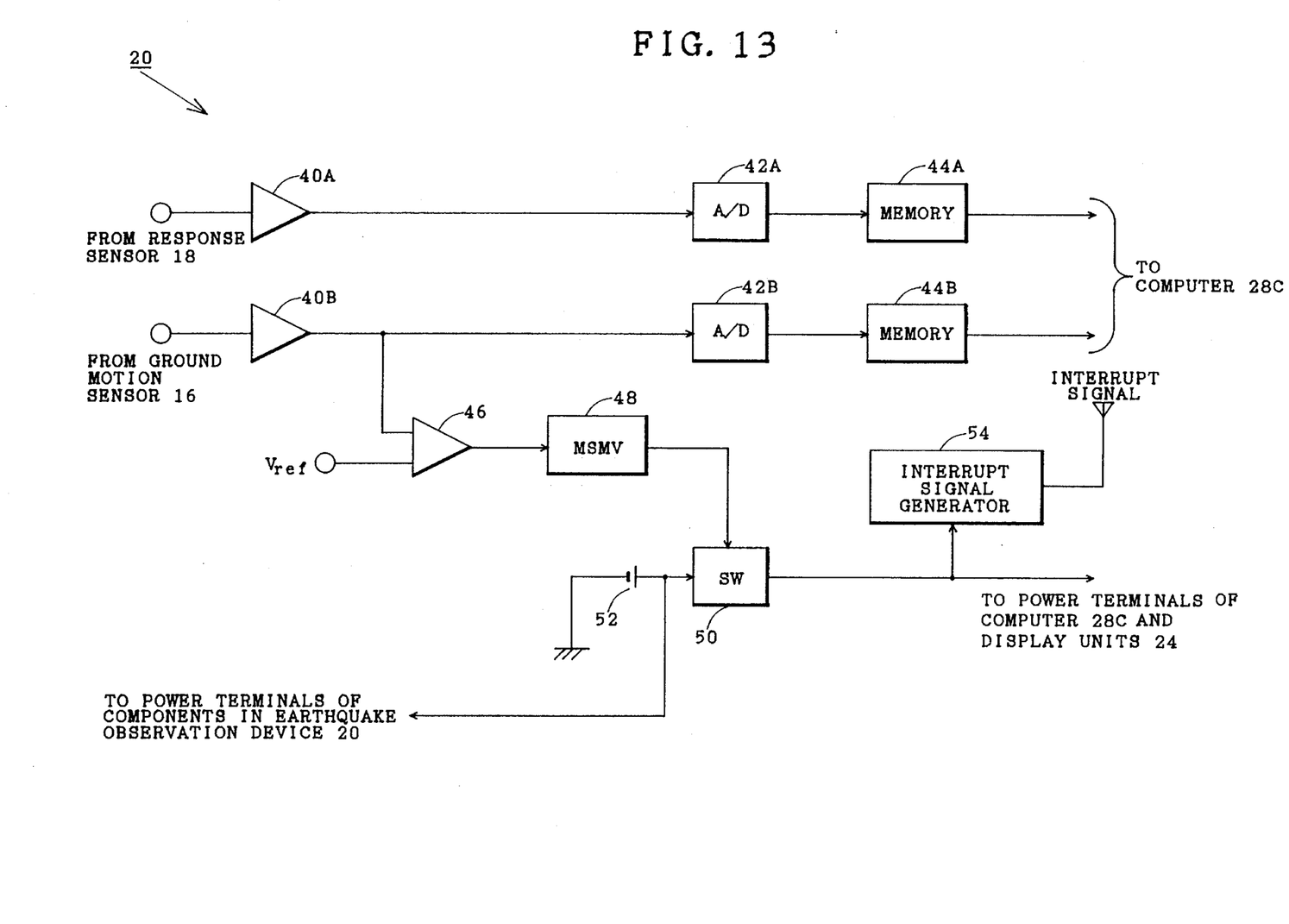
FIG. 13 is a block diagram, showing an arrangement example of an earthquake observation device for feeding supply voltage to major components as soon as earthquake occurs and for interrupting public broadcasting system and broadcasting the data on the system.

FIG. 13 is a block diagram showing a configuration of an earthquake observation device 20 for turning on major components of the apparatus when earthquake occurs or for interrupting the broadcasting system. The earthquake observation device 20 is designed in 6-channel configuration to respond to XYZ signals, which are output signals of the ground motion sensor 16 and the response sensor 18. To simplify the explanation, it is shown as 2-channel configuration having 1 channel each. The output signal of each of the sensors 16 and 18 is amplified by amplifiers 40A and 40B and is then converted by A/D converters 42A and 42B and digitized and is sequentially stored in memories 44A and 44B. Supply voltage from the power source 52 is always supplied to the amplifiers 40A and 40B, A/D converters 42A and 42B, and memories 44A and 44B. Supply voltage from the power source 52 is also permanently supplied to a comparator 46, which compares the output signal level of the amplifier 42B with reference voltage Vref and turns the output signal to H level when it exceeds the reference voltage Vref, and also to a monostable multi-vibrator (MSMV) 48, which responds to output of a comparator 46 and outputs signal of H level for a given period of time. When output signal of MSMV 48 is the same as H level, supply voltage from the power source 52 is supplied to the personal computer 28C and to the display unit 24 via a switch 50. An interrupt signal generator 54 is also turned on to perform necessary broadcasting.

With the arrangement as described above, it is possible to save energy and to achieve interrupt to the broadcasting system. The memories 44A and 44B may be a single memory, and capacity of about 1 MB will suffice if data are stored by step of 1/100 second for each channel. If a multiplexer is used, a single A/D converter may be used instead of A/D converters 42A and 42B shown in the figure. When output signal of the sensors 16 and 18 are converted to data signal and are sequentially stored as described above, it is possible to process the data as soon as earthquake occurs by the computer 28C regardless of the delay in power supply when earthquake occurs. The arrangement of FIG. 13 can be similarly utilized for the embodiments of FIG. 1 and FIG. 3.

The effects of the present invention are as follows:

(a) The residents in a structure with damper or base isolator can actually feel effectiveness and value of the damping or base isolation system.

(b) The data showing effectiveness of damping or base isolation system can be publicly announced at once.

(c) The above will contribute to further development of damping or base isolation techniques.

What is claimed is:

1. An apparatus for displaying a reduction of a swinging motion effect in a structure with a damper or a base isolator, as compared to swinging motion effect in the structure without the damper or the base isolator, comprising:

a response wave calculating means for responding to an output signal of a ground motion sensor which measures ground motion directly in close proximity to the structure, said response wave calculating means calculating a response of the structure to the ground motion under an assumption that the structure is not provided with a damper or a base isolator, thereby outputting a calculated response wave signal;

a measured response wave sensor mounted to the structure for measuring and outputting a measured response wave signal produced when the structure moves in a swinging fashion in response to the ground motion applied to said structure;

computing means for receiving said calculated response wave signal output from said response wave calculating means and said measured response wave signal output from said measured response wave sensor and computing a first maximum amplitude for said calculated response wave signal and a second maximum amplitude for said measured response wave signal; and display means provided at a predetermined position in the structure for displaying a comparison output signal from said computing means which includes a comparison of said first maximum amplitude of said calculated response wave signal and said second maximum amplitude of said measured response wave signal.

2. An apparatus for displaying reduction of a swinging motion effect according to claim 1, wherein said display means compares and displays the first maximum amplitude of said calculated response wave signal and the second maximum amplitude of said measured response wave signal schematically expressed as a graphic display.

3. An apparatus for displaying reduction of a swinging motion effect according to claim 1, further comprising a calculating means for responding to the output signal of said computing means and for obtaining a ratio signal of the second maximum amplitude of said measured response wave signal to the first maximum amplitude of said calculated response wave signal, said ratio signal being output to said display means, said display means being designed to display said ratio signal as a reduction ratio of swinging motion.

4. An apparatus for displaying reduction of swinging motion effect according to claim 1, wherein said computing means responds to said measured response wave signal and said calculated response wave signal and obtains a signal representing the duration of felt swinging of each wave, and outputs said duration signal to said display means.

5. An apparatus for displaying reduction of swinging motion effect according to claim 4, further comprising a calculating means, which responds to said duration signal output from said computing means and computes a ratio of the duration of felt swinging motion of said measured response wave signal to the duration of felt swinging motion of said calculated response wave signal, said ratio signal output from said calculating means being input to said display means, said display means being designed to display said ratio signal as a reduction ratio of the duration of felt swinging motion.

6. An apparatus for displaying reduction of swinging motion effect according to claim 1, wherein said display means receives and displays earthquake data from outside.

7. An apparatus for displaying reduction of swinging motion effect according to claim 1, further comprising a communication means for responding to said output signal of said ground motion sensor for communicating with at least one of a general purpose computer and a special purpose computer used as said response wave calculating means at a remote location.

8. An apparatus for displaying reduction of swinging motion effect according to claim 1, further comprising a switching means for responding to said output signal of said ground motion sensor, wherein if a level of said output signal of said ground motion sensor exceeds a predetermined value, supply voltage from a power source is provided to at least one of said response wave calculating means and said display means over a predetermined period of time.

9. An apparatus for displaying reduction of swinging motion effect according to claim 8, further comprising a memory means for temporarily storing said output signal of said ground motion sensor and said measured response wave signal.

* * * * *